US011509863B2

(12) United States Patent
Jeyakumar et al.

(10) Patent No.: US 11,509,863 B2
(45) Date of Patent: Nov. 22, 2022

(54) MULTI-USER INTERACTION SLATES FOR IMPROVED VIDEO CONFERENCING

(71) Applicant: Google LLC, Mountain View, CA (US)

(72) Inventors: Kevin Jonathan Jeyakumar, Seattle, WA (US); Carrie Christina Merry Barkema, Duvall, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/208,471

(22) Filed: Mar. 22, 2021

(65) Prior Publication Data
US 2022/0303501 A1    Sep. 22, 2022

(51) Int. Cl.
| H04N 7/15 | (2006.01) |
| G06F 40/143 | (2020.01) |
| G06F 3/0481 | (2022.01) |
| A63F 13/87 | (2014.01) |
| G06F 3/0484 | (2022.01) |

(52) U.S. Cl.
CPC ............. *H04N 7/152* (2013.01); *A63F 13/87* (2014.09); *G06F 3/0481* (2013.01); *G06F 3/0484* (2013.01); *G06F 40/143* (2020.01); *A63F 2300/572* (2013.01)

(58) Field of Classification Search
CPC ............ H04N 1/42; H04N 7/14; H04N 7/141; H04N 7/15; H04N 7/157
USPC ................................ 348/14.01, 14.02, 14.08
See application file for complete search history.

(56) References Cited

U.S. PATENT DOCUMENTS

| 7,162,528 | B1 | 1/2007 | Simonoff et al. |
| 7,533,146 | B1 | 5/2009 | Kumar |
| 7,681,136 | B2 | 3/2010 | Gennaro et al. |
| 9,699,411 | B2 * | 7/2017 | Nelson .................. H04M 3/567 |

(Continued)

FOREIGN PATENT DOCUMENTS

| CN | 110727361 | 1/2020 |
| WO | WO2015080386 A1 | 6/2015 |
| WO | WO 2017/035368 | 3/2017 |

OTHER PUBLICATIONS

Burns, "Netflix Party lets long distance friends watch together", Techcrunch.com, https://techcrunch.com/2016/03/28/netflix-party-lets-long-distance-friends-watch-together/?guccounter=1, Mar. 28, 2018, 1 page.

(Continued)

*Primary Examiner* — Maria El-Zoobi
(74) *Attorney, Agent, or Firm* — Dority & Manning, P.A.

(57) ABSTRACT

A video conferencing system includes a multi-user interaction slate for the execution of applications having a state that is responsive to inputs from multiple attendees of a video conference. The video conferencing system includes a graphical user interface having video slates provided for video streams and multi-user interaction slates for the execution of code that is responsive to inputs provided at multiple client devices. The video conferencing system can determine a current state of a multi-user interaction slate in response to inputs provided by users of the client devices in association with the multi-user interaction slate. The video conferencing system can provide data for rendering the graphical user interface, including video data associated with the video slates and data indicative of the current state of the multi-user interaction slate.

20 Claims, 6 Drawing Sheets

(56) References Cited

U.S. PATENT DOCUMENTS

| | | | |
|---|---|---|---|
| 10,768,885 B1 | 9/2020 | Fieldman | |
| 2009/0249244 A1* | 10/2009 | Robinson | G06F 3/04817 715/781 |
| 2012/0092436 A1 | 4/2012 | Pahud et al. | |
| 2012/0278738 A1* | 11/2012 | Kruse | G06Q 10/10 715/756 |
| 2012/0304073 A1 | 11/2012 | Mandic et al. | |
| 2013/0111391 A1 | 5/2013 | Penner et al. | |
| 2016/0231888 A1* | 8/2016 | Govindraj | G06F 3/04847 |
| 2019/0088153 A1 | 3/2019 | Bader-Natal et al. | |
| 2020/0374324 A1 | 11/2020 | Le Strat et al. | |

OTHER PUBLICATIONS

Castillo, "Music industry's move to get more listeners online may threaten YouTube", CNBC.com, https://www.cnbc.com/2017/03/16/vevo-launches-watch-party.html, Mar. 16, 2017, 2 pages.

International Search Report and Written Opinion for Application No. PCT/US2022/021130, dated Jun. 20, 2022, 15 pages.

* cited by examiner

MULTI-USER INTERACTION SLATES FOR IMPROVED VIDEO CONFERENCING

FIELD

The present disclosure relates generally to multi-attendee video conferencing systems.

BACKGROUND

Multi-attendee video conferencing techniques can provide video streams to a client device for multiple attendees of a video conference. As an example, a speaking attendee may be displayed in a first display region while non-speaking attendees may be displayed in other display regions. Some video conferencing techniques permit content sharing between attendees during a video conference. For example, some systems may permit an attendee to share all or a portion of their display with other attendees who may view the content currently rendered on the display.

While current video conferencing techniques may enable attendees to share content, there remains a need for techniques to further collaboration and interaction between multiple attendees of a video conference.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method that comprises, by one or more processors, receiving a request from a first user of a first client device for execution of a multi-user interaction slate within a graphical user interface of a video conferencing system including a plurality of slates. The plurality of slates includes a first slate associated with a video stream of the first user, a second slate associated with a video stream of a second user of a second client device, and the multi-user interaction slate including computer-executable code that is responsive to inputs provided by the first user at the first client device and inputs provided by the second user at the second client device. The method includes determining a current state of the multi-user interaction slate in response to one or more inputs provided by the first user at the first client device in association with the multi-user interaction slate and one or more inputs provided by the second user at the second client device in association with the multi-user interaction slate and providing data for rendering the graphical user interface of the video conferencing system, the data including video data associated with the first user for the video stream of the first slate, video data associated with the second user for the video stream of the second slate, and data indicative of the current state of the multi-user interaction slate.

Another example aspect of the present disclosure is directed to a computing system including one or more processors and one or more non-transitory, computer-readable media that store instructions that when executed by the one or more processors cause the computing system to perform operations. The operations include receiving a request from a first user of a first client device for execution of a multi-user interaction slate within a graphical user interface of a video conferencing system including a plurality of slates. The plurality of slates includes a first slate associated with a video stream of the first user, a second slate associated with a video stream of a second user of a second client device, and the multi-user interaction slate including computer-executable code that is responsive to inputs provided by the first user at the first client device and inputs provided by the second user at the second client device. The operations include determining a current state of the multi-user interaction slate in response to one or more inputs provided by the first user at the first client device in association with the multi-user interaction slate and one or more inputs provided by the second user at the second client device in association with the multi-user interaction slate, and providing data for rendering the graphical user interface of the video conferencing system, the data including video data associated with the first user for the video stream of the first slate, video data associated with the second user for the video stream of the second slate, and data indicative of the current state of the multi-user interaction slate.

Yet another example aspect of the present disclosure is directed to one or more non-transitory computer-readable media that store instructions that, when executed by one or more processors of a computing system, cause the computing system to perform operations. The operations include receiving a request from a first user of a first client device for execution of a multi-user interaction slate within a graphical user interface of a video conferencing system including a plurality of slates. The plurality of slates includes a first slate associated with a video stream of the first user, a second slate associated with a video stream of a second user of a second client device, and the multi-user interaction slate including computer-executable code that is responsive to inputs provided by the first user at the first client device and inputs provided by the second user at the second client device. The operations include determining a current state of the multi-user interaction slate in response to one or more inputs provided by the first user at the first client device in association with the multi-user interaction slate and one or more inputs provided by the second user at the second client device in association with the multi-user interaction slate, and providing data for rendering the graphical user interface of the video conferencing system, the data including video data associated with the first user for the video stream of the first slate, video data associated with the second user for the video stream of the second slate, and data indicative of the current state of the multi-user interaction slate.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for implementing and utilizing a video conferencing system.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
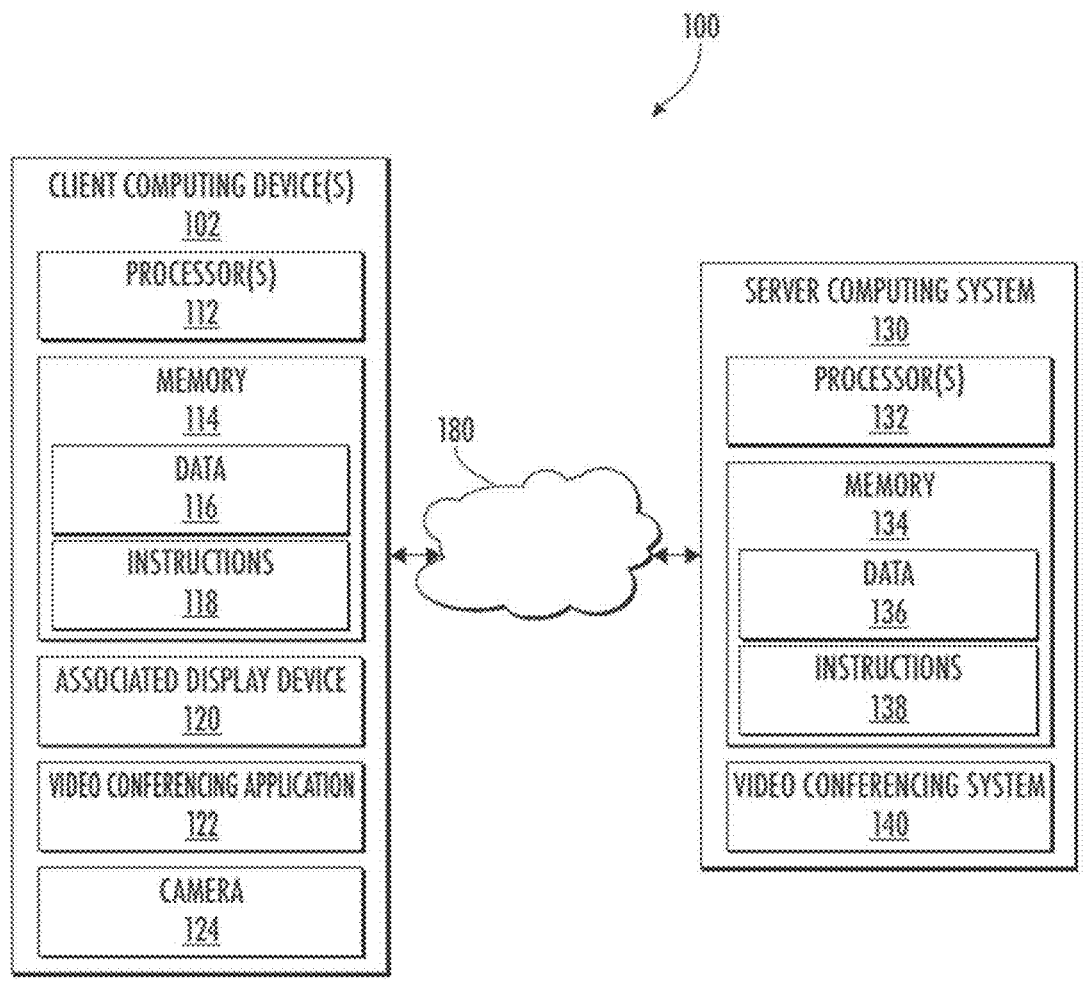
FIG. 1 depicts a block diagram of example computing systems according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to a video conferencing system including a graphical user interface (GUI) having an interaction slate in which a software application can be executed that is responsive to inputs from multiple attendees of a video conference. The state of an application such as a web browser, video player, gaming or other application executing in the multi-user interaction slate can respond and change in real-time as multiple attendees of the video conference interact with the interaction slate. The multi-user interaction slate can execute various applications for the video conferencing system to facilitate interactions by multiple attendees within the graphical user interface. By way of example, a multi-user interaction slate can include an application such as a web browser that is capable of executing hyper-text markup language (html) or other code. The web browser executing in the interaction slate may respond to inputs from multiple attendees of the video conference such that the browser state is responsive to multiple user interactions. In this manner, an improved collaborative experience can be provided by enabling multiple users to engage with content through an interaction slate provided as part of a GUI including video streams for the video conference.

Embodiments in accordance with the present disclosure enable various interactions to be shared collaboratively between multiple attendees of a video conference, including the ability to jointly interact with shared content. Traditionally, video conferencing applications permit only limited shared experiences, such as permitting a selected user to share content but not allowing additional users to interact with the shared content. By contrast, embodiments of the present disclosure provide shared applications within an interaction slate that reacts in real-time to multiple user inputs. Additionally, embodiments of the present disclosure enable various applications to be executed within an interaction slate. In this manner, an attendee may select from among various available applications such as web browsers, video players, games, etc. that can be executed in a multi-user interaction slate to enable multiple attendees to interact with the application. The video conferencing system can further provide the ability for an attendee to control interaction through user and display settings that define permissions and parameters for interaction with a multi-user interaction slate by other attendees of the video conference.

In accordance with example aspects of the disclosed technology, a video conferencing system may include a graphical user interface (GUI) that is rendered on a display of respective client computing devices for attendees of a video conference. The GUI may include individual slates that render content associated with the slate. For instance, a first slate may render a video stream associated with a first attendee and a second slate may render a video stream associated with a second attendee. Additional slates may be instantiated for the video streams of other attendees and/or for rendering additional content such as a document being shared by one of the attendees. In accordance with example aspects of the present disclosure, the GUI of the video conferencing system may include one or more multi-user interaction slates that are configured to respond to inputs from multiple attendees of the video conference and render content responsive to those inputs. In this manner, the multi-user interaction slate provides a collaborative environment that enables more than one attendee of a video conference to interact with the same content. Moreover, the interaction slate can be presented in association with other slates that display video streams for attendees of the video conference. In this manner, the shared interaction slate may be presented in the same GUI with the video streams to provide an immersive and collaborative experience for interacting with a shared application. For example, the multi-user interaction slate may execute a web browser that is responsive to HTML inputs or commands from the client devices of multiple attendees. The content associated with the execution of HTML code can be rendered in the multi-user interaction slate displayed at the client device of each attendee. In this manner, example aspects of the disclosed technology provide multi-user interaction capabilities with content rendered for a shared video conference in addition to the ability to view content based on a single user's interaction.

A multi-user interaction slate according to exemplary aspects can include computer-executable code that is responsive to inputs provided by multiple attendees of a shared video conference. Inputs provided by users at various remote client devices can be processed by executable code associated with an interaction slate. By way of example, an interaction slate may execute code for applications including web browsers, gaming applications, productivity applications, word processing applications and the like. In some implementations, the GUI of the video conferencing system is configured to receive input from an attendee indicating that a multi-user interaction slate is to be provided for a video conference. The GUI can provide the user with options or the ability to select from available applications that can execute in the interaction slate. The user may select from existing applications and/or provide input identifying other executable code that is to be executed within the multi-user interaction slate.

In accordance with example embodiments, the video conferencing system can enable one or more attendees to manage a multi-user interaction slate for a shared video conference. In various examples, the video conferencing system may include one or more user settings and/or display settings that allow a multi-user interaction slate to be customized for a video conference. User settings may enable particular users to be granted a particular set of permissions with respect to the interaction slate while display settings may enable the display of content for the interaction slate to be managed for individual client devices.

According to some example aspects, the video conferencing system can include various settings that are configurable in response to user inputs. By way of example, a first attendee can create or otherwise instantiate a multi-user interaction slate for a video conference. The attendee that creates or initiates a multi-user interaction slate for a video conference may be referred to a creator in some examples. In response to the first attendee, or creator, initiating the multi-user interaction slate, the GUI can display to the first attendee various user or display settings. For example, the user settings can enable the first attendee to select or otherwise define which attendees are able to view, edit, otherwise interact with the interaction slate for the display of content and other functions. By way of example, a first attendee can be granted different (e.g, more or fewer) permissions than a second user. The first user may be granted view and full edit permissions while the second user may only be granted view permissions and limited editing permissions. The permissions may be changed. The display settings may enable the first user to lock the display of the interaction slate at particular client devices or to enable the client devices to individually control the display of content. A locked view provides a consistent view of the interaction slate at each client device. An individual view permits each user and/or client device to have an independently controllable view of the multi-user interaction slate. In some examples, a respective display of content within the multi-user interaction slate at each client device is responsively adaptive to view capabilities associated with such client device. The content can adapt to the view capabilities of a smartphone, tablet device, or desktop computer, for example.

According to some example aspects, the multi-user interaction slate provides annotation capabilities for individual users, in addition to the ability to control the execution of code within the interaction slate. Attendees of the video conference can annotate content displayed within the interaction slate using text comment boxes, shape tools, freeform inking (e.g., mouse and pen) and select the color of their annotations. These annotations can be seen by other attendees over the existing content, such as an annotation of a displayed webpage. Additionally, the interaction slate may enable screenshots and exports. For example, attendees can be permitted to capture select portions of the displayed content or the entire content associated with an interaction slate. The selected portion can be exported along with other meeting artifacts. For example, a log of all user interactions with the interaction slate including user inputs to the executable code and annotations can be maintained by the video conferencing system, thereby enabling attendees to playback the slate interactions during the video conference.

In some examples, the video conferencing system provides one or more containers including application code that is executable within a multi-user interaction slate. A web browser, gaming, or other application may be packaged in a containerized application for execution in association with the interaction slate. In some examples, a container may be deployed at a server or other central computing system that hosts the video conferencing system. In response to launching an interaction slate for a video conference, the video conferencing system can execute the container executable instructions. Content associated with execution of the instructions can be provided to the individual client devices of the attendees. In another example, a container may be deployed at one or more of the client devices for executing code for the interaction slate. For example, application code can be executed in a container at the client device of an attendee that creates or otherwise instantiates a particular interaction slate. In such examples, the video conferencing system can manage execution of the application code to provide a collaborative and consistent representation of the content. In yet another example, the application code can be distributed to or executed by two more client devices of attendees of the video conference. In such an example, the video conferencing system can communicate with the applications at each client device so the state of the distributed application changes in response to inputs from any of the client devices.

In some examples, the video conferencing system may include a slate manager that is configured to manage the slates instantiated for a video conference, and to maintain state between content rendered in a multi-user interaction slate. For instance, the slate manager can be configured as part of the video conferencing system at one or more servers to manage the execution of application code instantiated at a server computing system for the video conferencing system. The slate manager can manage the central execution of code for the multi-user interaction slate and manage the distribution of content to each client device in association with the code execution. Each client device can render the content at the interaction slate of the GUI for the video conferencing application at the client device. In another example, the slate manager can manage the execution of application code instantiated at one or more client computing devices for the multi-user interaction slate. The slate manager can be provided at one or more client devices to manage the execution of code for the multi-user interaction slate and manage the distribution of content from the executing device to the video conferencing system and/or directly to other client devices. Each client device can render the content in the interaction slate of the GUI for the video conferencing application at the client device. In yet another example, the slate manager can manage the execution of code by multiple client devices. For example, each client device may include a virtual machine that executes at least a portion of the code for the interaction slate. The slate manager can manage the execution of code by the individual clients to maintain state in response to inputs from multiple ones of the client devices.

In accordance with example embodiments, a video conferencing system can receive a request from a first user of a first client device for execution of a multi-user interaction slate within a graphical user interface of a shared video conferencing application. The request may be received as part of video conference having a plurality of slates including a first slate associated with a video stream of the first user and a second slate associated with a video stream of a second user of a second client device. The multi-user interaction slate can be instantiated with computer-executable code that is responsive to inputs provided by the first user at the first client device and inputs provided by the second user at the second client device. The video conferencing system can determine a current state of the interaction slate in response to one or more inputs provided by the first user at the first client device and one or more inputs provided by the second user at the second client device in association with the multi-user interaction slate. In response, the system can provide data for rendering the graphical user interface of the shared video conferencing application. The data can include video data associated with the first user for the video stream of the first slate, video data associated with the second user for the video stream of the second slate, and data indicative of the current state of the multi-user interaction slate.

The present disclosure provides a number of technical effects and benefits. As one example technical effect and benefit, the systems and methods of the present disclosure enable multiple attendees of a video conference to interact with the same content within the graphical user interface of a video conferencing system. In this manner, the video conferencing system enables attendees to not only view content shared by other attendees, but to interact with the content in a collaborative manner. Additionally, this enables multi-user interaction within the video conferencing system, rather than each user and client individually interacting with content that is not responsive to other attendee inputs. In accordance with example embodiments, a multi-user interaction slate is capable of executing application code for various applications such as web browsers, gaming applications, productivity applications and the like. The application code is responsive to inputs from the individual client devices, enabling state changes in real-time as different attendees interact with the interaction slate. The application code can be centrally managed and/or distributed to one or more client devices. With an interaction slate architecture, the video conferencing system enables predetermined code as well as user-defined code to be executed in the multi-user interaction slate. In this manner, computing efficiencies including reduced bandwidth can be provided for a multi-user interaction slate.

With reference now to the Figures, example embodiments of the present disclosure will be discussed in further detail.

FIG. 1 depicts an example client-server environment 100 according to example embodiments of the present disclosure. The client-server environment 100 includes a client computing device 102 and a server computing system 130 that are connected by and communicate through a network 180. Although a single client computing device 102 is depicted, any number of client computing devices 102 can be included in the client-server environment 100 and connect to server computing system 130 over a network 180.

In some example embodiments, the client computing device 102 can be any suitable device, including, but not limited to, a smartphone, a tablet, a laptop, a desktop computer, or any other computer device that is configured such that it can allow a user to participate in a video conference. The client computing device 102 can include one or more processor(s) 112, memory 114, an associated display device 120, a video conferencing application 122, and a camera 124.

The one or more processor(s) 112 can be any suitable processing device, such as a microprocessor, microcontroller, integrated circuit, or other suitable processing device.

The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the client computing device 102 and the server computing system 130 (e.g., one or more video conferencing applications 122, etc.). The client computing device 102 can implement the instructions to execute aspects of the present disclosure, including directing communications with server computing system 130, providing a video conferencing application 122 and/or video stream to a user, processing requests from users for execution of a multi-interaction slate, and determining and providing data indicative of the current state of the interaction slate.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130), that can be retrieved, manipulated, created, or stored by the one or more processor(s) 112. In some example embodiments, such data can be accessed and displayed to one or more users of the client computing device 102 during a video conference or transmitted to the server computing system 130.

The client computing device 102 can execute a video conferencing application 122. The video conferencing application can capture image data from a camera 124 and transmit that data to the server computing system. The client computing device 102 can receive, from the server computing system 130 image data from one or more other participants of the video conference (e.g., other client computing devices 102). The client computing device 102 can then display the received image data to users of the client computing device 102 on associated display device 120. In some example embodiments, the camera 124 collects image data from one or more users. The camera can be any device capable of capturing visual data.

More particularly, the client computing device 102 can receive one or more video streams from the server computing system 130. The client computing device 102 can, as an example, display the received video streams in the associated display device 120 (e.g., a laptop display device, a smartphone display device, a communicatively connected display device, etc.) including a multi-user interaction slate. For example, the client computing device 102 can receive a request from a first user at a first client device for execution of a multi-user interaction slate within the GUI provided by the video conferencing system. The GUI can include a plurality of slates including one or more slates associated with respective video streams of one or more users. The multi-user interaction slate can include computer-executable code that is responsive to inputs provided by multiple attendees at respective client devices.

Additionally, or alternatively, in some implementations, the client computing device 102 can generate a video stream and send the video stream to the server computing system 130 (e.g., via network(s) 180). More particularly, the client computing device 102 can capture a video stream using camera 124 (e.g., an integrated webcam, communicatively connected camera device, etc.). The client computing device 102 can encode the captured video (e.g., as specified by instructions 118, etc.).

In accordance with some example embodiments, the server computing system 130 can include one or more processor(s) 132, memory 134, and a video conferencing system 140. The memory 134 can store information accessible by the one or more processor(s) 132, including instructions 138 that can be executed by processor(s) and data 136.

The server computing system 130 can be in communication with one or more client computing device(s) 102 using a network communication device that is not pictured. The network 180 can be any type of communications network, such as a local area network (e.g., intranet), wide area network (e.g., Internet), or some combination thereof. In general, communication between the client computing device 102 and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can include a video conferencing system 140. In some implementations, the video conferencing system 140 can be configured to facilitate operation of the video conferencing application 122 executed by one or more client computing devices 102. As an example, the video conferencing system 140 can receive video streams from a plurality of client computing devices 102 (e.g., via network 180) respectively associated with a plurality of video conference attendees. The video conferencing system 140 can provide the video streams to each of the client computing devices 102. Further, the video conferencing system 140 can manage provided stream quality. In some implementations, the video conferencing system 140 can manage provided stream quality by transmitting requests to client computing devices 102 to provide video streams with a certain quality and/or resolution. In such fashion, the server computing system 130 can utilize video conferencing system 140 to facilitate the functionality of the video conferencing applications 122 on each client computing device 102.

It is noted that video conferencing application 122 can be considered part of the video conferencing system 140 in example embodiments. In various examples, video conferencing application 122 and/or video conferencing system 140 can determine a current state of the multi-user interaction slate in response to inputs provided by the first user at client device 102 as well as inputs from other users at other client devices. The video conferencing application and/or system can provide data for rendering the GUI. The data can include video data associated with one or more attendees for respective slates of the GUI and data indicative of the current state of the multi-user interaction slate. The data indicative of the current state can include content data representing the current state or state data allowing other computing devices to retrieve content representing the current state. For example, data 116 and/or 136 may include content data and/or state data in accordance with example embodiments. Content data may provide content that is rendered at the client computing device 102. State data may provide instructions, commands, or other information for the video conferencing application 122 to maintain a current state with other client devices.

Figure 2:
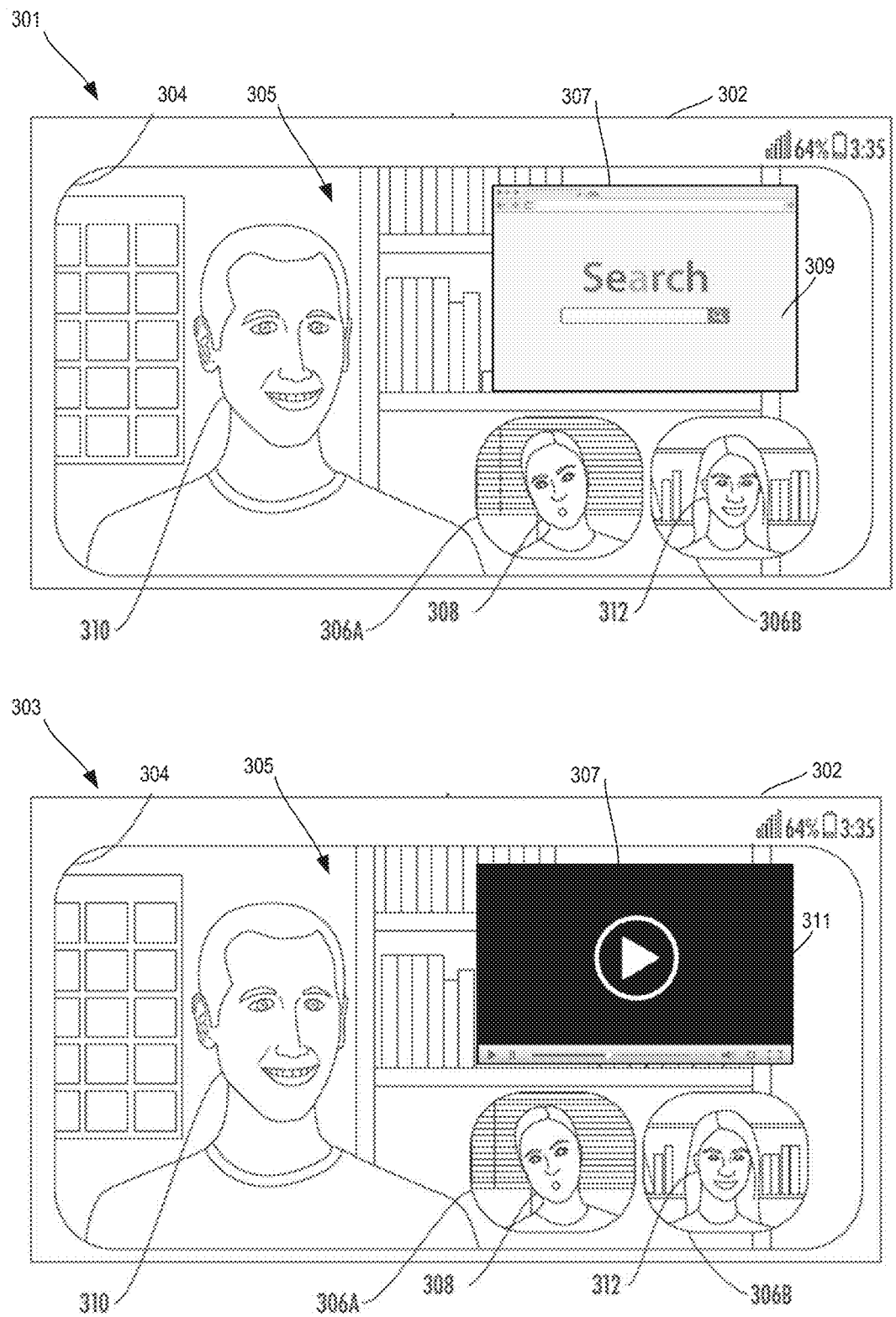
FIG. 2 depicts example graphical user interfaces of a multi-attendee video conferencing system including a multi-user interaction slate according to example embodiments of the present disclosure.

FIG. 2 depicts an example graphical user interface of a multi-attendee video conferencing application 122 and video conferencing system 140 according to example embodiments of the present disclosure. As shown at 301, client device 302 (e.g., a smartphone, tablet, laptop computer, etc.) can display a video stream of a first attendee 310 in a primary display region or slate 304 of GUI 305. In some examples, the speaking role of the first attendee 310 can be a dominant speaking role (e.g., the attendee that is currently speaking, etc.) and based on the dominant speaking role of the first attendee 310, the client device 302 can display the video stream of the first attendee 310 in primary slate 304. Although the primary slate 304 is depicted as using the entirety of the display of client device 302, it should be noted that the primary slate 304 does not necessarily need to do so. As an example, the primary slate 304 may use 80% of the available display of the client device 302.

The client device 302 can display a video stream for a second attendee 308 and a video stream for a third attendee 312 in video slates 306A and 306B. For example, the speaking roles of second attendee 308 and third attendee 312 can be non-dominant speaking roles (e.g., the attendees that are not currently speaking, etc.). Based on the non-dominant speaking roles of the second attendee 308 and the third attendee 312, the client device 302 can display the video streams of the second attendee 308 and the third attendee 312 respectively in the video slates 306A and 306B. Additionally, or alternatively, it should be noted that the video slates 306A and 306B do not necessarily need to be overlaid on the primary slate 304. In some implementations, the video slates 306A and 306B can instead be displayed adjacent to the primary slate 304. Additionally, three video slates are provided by way of example only. A multi-attendee videoconference may include any number of slates and associated video streams.

As shown at 301, graphical user interface (GUI) 305 includes an interaction slate 307 in which a software application can be executed that is responsive to inputs from multiple attendees of the video conference. In this example, the interaction slate 307 hosts a web browser application 309 which can execute in association with the multi-user interaction slate. The web browser can respond and change in real-time as multiple attendees of the video conference interact with the interaction slate. For example, video conference attendees can browse the web, click links, scroll, search, and do all of the typical things a user would do with a web browser. The multi-user interaction slate can execute various applications for the video conferencing system to facilitate interactions by multiple attendees within the graphical user interface. Web browser application 309 is capable of executing hyper-text markup language (HTML) or other code. The web browser executing in the interaction slate may respond to inputs from multiple attendees of the video conference such that the browser state is responsive to multiple user interactions. In this manner, an improved collaborative experience can be provided by enabling multiple users to engage with content.

At 303, GUI 305 is depicted with an interaction slate 307 hosting a video player application 311 which can execute in or in association with the multi-user interaction slate. The video player application can respond and change in real-time as multiple attendees of the video conference interact with the interaction slate. For example, video conference attendees can browse available videos, click links, play, pause, fast forward, rewind, scroll, search, and do all of the typical things a user would do with a web-enabled video player. Video player application 311 can be capable executing hyper-text markup language (html) or other code. The video player application may respond to inputs from multiple attendees of the video conference such that the player state is responsive to multiple user interactions. In this manner, an improved collaborative experience can be provided by enabling multiple users to engage with video content.

FIG. 2 depicts a subset of available applications or code that can be executed in association with an interaction slate according to example embodiments of the present disclosure. An interaction slate in accordance with example aspects can enable various interactions to be shared collaboratively between multiple attendees of a video conference, including the ability to jointly interact with shared content. Embodiments of the present disclosure enable various applications to be executed within an interaction slate. In this manner, an attendee may select from among various available applications such as web browsers, video players, gaming applications, word processing or other productivity software, operating systems, code drafting tools, etc. that can be executed in a multi-user interaction slate to enable multiple attendees to interact with the application.

Figure 3:
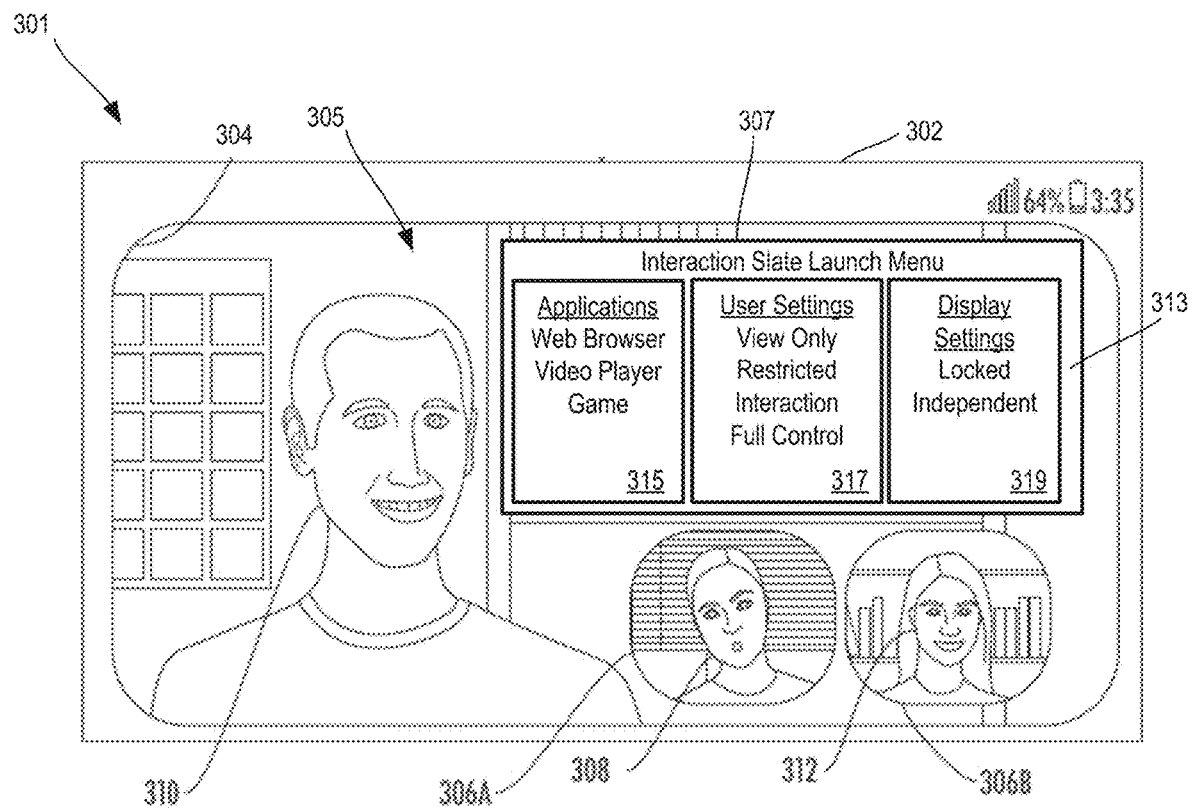
FIG. 3 depicts an example graphical user interface of a multi-attendee video conferencing system including an interaction slate configuration menu according to example embodiments of the present disclosure.

FIG. 3 depicts an example graphical user interface 305 of a multi-attendee video conferencing application 122 provided by video conferencing system 140 according to example embodiments of the present disclosure. As depicted in FIG. 3, the video conferencing system can further provide the ability for an attendee to control interaction through user and display settings or permissions for interaction with a multi-user interaction slate by other attendees of the video conference. The video conferencing system can enable one or more attendees to manage a multi-user interaction slate for a shared video conference. GUI 305 includes configuration menu 313 which enables an attendee (e.g., attendee 310) to launch and select settings for interaction slate 307. In response to launching or otherwise initiating the interaction slate 307, the video conferencing system may present configuration menu 313. Configuration menu 313 may include one or more user settings and/or display settings that allow a multi-user interaction slate to be customized for a video conference. User settings may enable particular users to be granted a particular set of permissions with respect to the interaction slate while display settings may enable the display of content for the interaction slate to be managed for individual client devices.

By way of example, a first attendee 310 can create or otherwise instantiate a multi-user interaction slate 307 for a video conference. Attendee 310 may be referred to as a creator in some examples. In response to the first attendee 310 initiating the multi-user interaction slate, the GUI can display to the first attendee various user or display settings in configuration menu 313. A first setting menu 315 enables attendee 310 to select from one or more available applications for execution within the interaction slate. In this particular example, the user may select from a web browser, video player, or gaming application. Fewer or additional applications may be included in a first setting menu 315 in various examples. In some example embodiments, an attendee may define a new application for launch. For instance, the attendee may specify a location of code that is to be executed for the interaction slate in a collaborative manner.

A second setting menu 317 includes user settings that can enable the first attendee to select or otherwise define which attendees are able to view, edit, or otherwise interact with the interaction slate to affect the display of content. In this particular example, the user settings include a view only setting, a restricted interaction setting, and a full control setting. In some examples, a first user can be granted different (e.g, more or fewer) permissions than a second user. The first user may be granted view and full edit permissions while the second user may only be granted view permissions and limited editing permissions. The permissions granted to a user can be changed.

A third setting menu 319 includes display settings that enable the first attendee to control the display of content within the interaction slate at various client devices. For example, the attendee can lock the display of the interaction slate at particular client devices or can enable the client devices to independently control the display of content. A locked view provides a consistent view of the interaction slate at each client device. An individual view permits each user and/or client device to have an independently controllable view of the multi-user interaction slate. This independent view can enable each attendee to scroll, resize, zoom, or otherwise define the display of content as they individually would like. Additionally, or alternatively, each user can have a different view depending on their screen (e.g., size and/or resolution).

Although not shown, interaction slate 307 may additionally include an annotation menu that provides annotation capabilities for individual users in addition to the ability to control the execution of code within the interaction slate. Attendees of the video conference can annotate content displayed within the interaction slate using text comment boxes, shape tools, free-form inking (e.g., mouse and pen) and select the color of their annotations. These annotations can be seen by other attendees over the existing content, such as an annotation of a displayed webpage. Annotations may be defined as a layer or page that overlays a displayed page. Additionally, the interaction slate may enable screenshots and exports. For example, attendees can be permitted to capture select portions of the displayed content or the entire content associated with an interaction slate. The selected portion can be exported along with other meeting artifacts. For example, a log of all user interactions with the interaction slate including user inputs to the executable code and annotations can be maintained by the video conferencing system, thereby enabling attendees to playback the slate interactions through the video conference.

Figure 4:
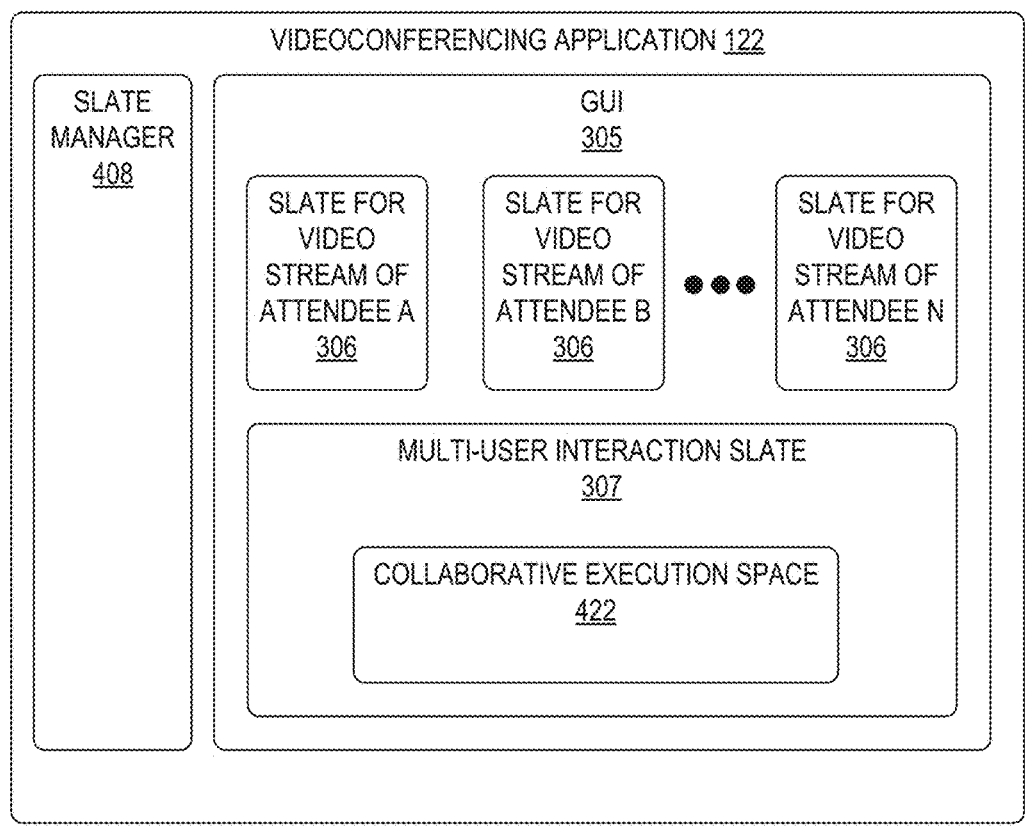
FIG. 4 depicts a block diagram of a portion of a multi-attendee video conferencing system including a video conferencing application at a client device according to example embodiments of the present disclosure.
Figure 5:
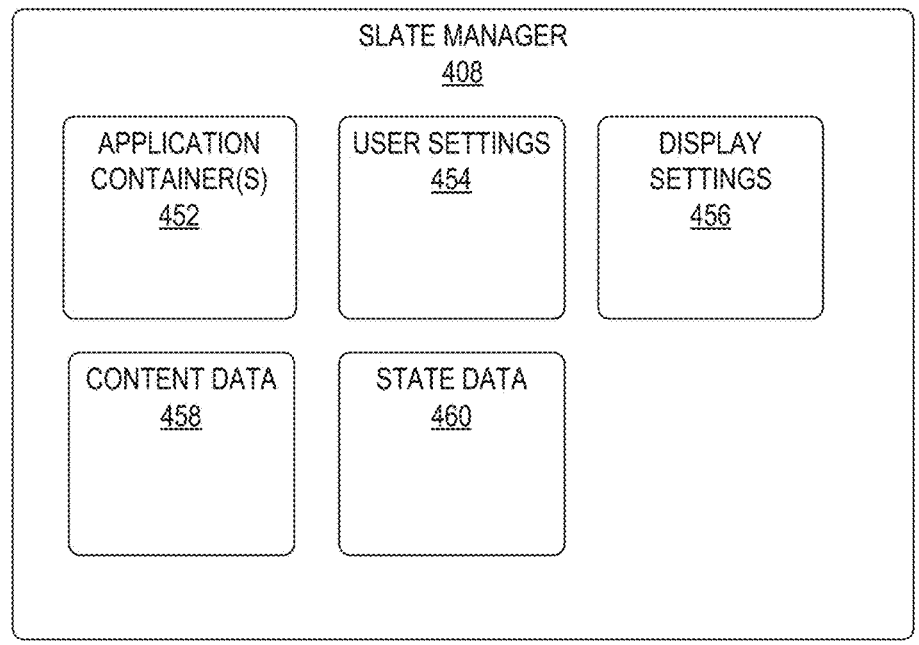
FIG. 5 depicts a block diagram of a portion of a multi-attendee video conferencing system including a slate manager according to example embodiments of the present disclosure.

FIG. 4 is a block diagram depicting a video conferencing application 122 in accordance with example aspects of the present disclosure. Video conferencing application 122 can be part of a video conferencing system 140 as earlier described. Video conferencing application 122 can be executed at a client device in example embodiments. Video conferencing application 122 includes a graphical user interface 305 having a plurality of slates. A plurality of video slates 306 are provided for rendering video content that is streamed in association with attendees A, B . . . , N. It is noted that any number of video slates 306 may be provided for rendering video associated with the attendees of the video conference. GUI 305 also includes a multi-user interaction slate 402 that provides a collaborative execution space 422. Although a single multi-user interaction slate 402 is depicted, more than one interaction slate may be provided within a video conference.

In some examples, the video conferencing system may include a slate manager 408 that is configured to manage the slates instantiated for a video conference, and to maintain state of the multi-user interaction slate 420 across client devices. Slate manager 408 can be configured at one or more client devices as part of video conferencing application 122 in some embodiments. In other embodiments, slate manager 408 can be configured at one or more server computing systems hosting video conferencing system 140. In yet other embodiments, slate manager 408 can be distributed at more than one client device and/or server computing system.

Figure 6:
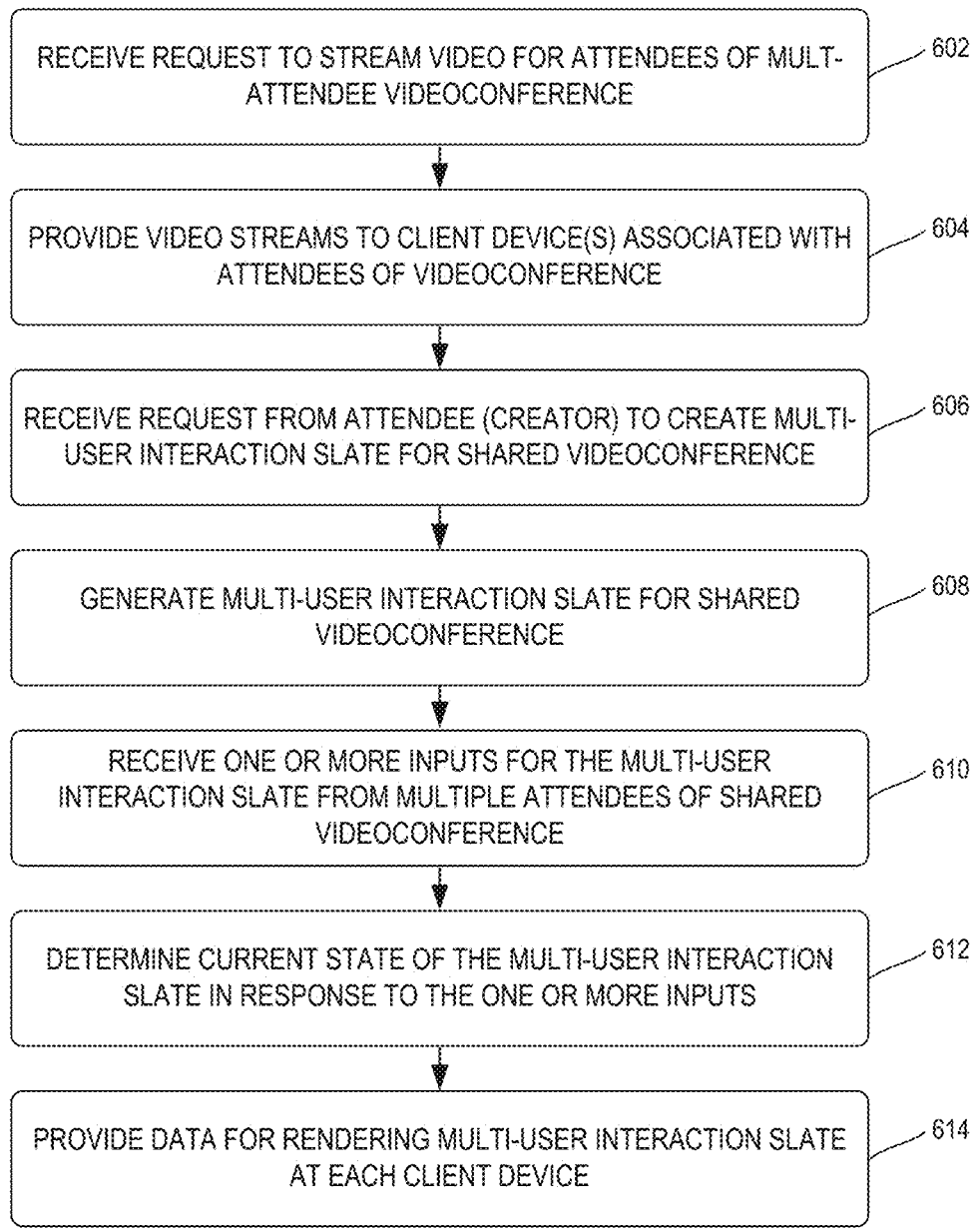
FIG. 6 depicts a flow diagram for providing a multi-attendee video conference including a multi-user interaction slate according to example embodiments of the present disclosure.

FIG. 6 is a block diagram depicting additional details of slate manager 408 according to example aspects of the present disclosure. Slate manager 408 can be configured to manage the execution of application code instantiated at a server computing system for the video conferencing system in some examples. The slate manager can manage the central execution of code for the multi-user interaction slate and manage the distribution of content to each client device in association with the code execution. Each client device can render the content in the interaction slate of the GUI for the video conferencing application at the client device. In another example, the slate manager 408 can manage the execution of application code instantiated at one or more client computing devices for the multi-user interaction slate. The slate manager can be provided at one or more client devices to manage the execution of code for the multi-user interaction slate and manage the distribution of content from the executing device to the video conferencing system and/or directly to other client devices. Each client device can render the content in the interaction slate of the GUI for the video conferencing application at the client device. In yet another example, the slate manager 408 can manage the execution of code by multiple client devices. For example, each client device may include a virtual machine that executes at least a portion of the code for the interaction slate. The slate manager 408 can manage the execution of code by the individual clients to maintain state in response to inputs from multiple ones of the client devices.

Slate manager 408 may include or otherwise manage user settings 454, display settings 456, content data 458, and state data 460. The content data can include video data associated with one or more attendees for respective slates of the GUI and the state data can include data indicative of the current state of the multi-user interaction slate. In some embodiments, the content data may include state data. The data indicative of the current state can include content data representing the current state or state data allowing other computing devices to retrieve content representing the current state.

In some examples, the video conferencing system provides one or more application containers 452 including application code that is executable within a multi-user interaction slate. A web browser, gaming, or other application may be packaged in a containerized application for execution in association with the interaction slate. In some examples, a container 452 may be deployed at a server or other central computing system that hosts the video conferencing system. In response to launching an interaction slate for a video conference, the video conferencing system can execute the container executable instructions. Content associated with execution of the instructions can be provided to the individual client devices of the attendees. In another example, a container may be deployed at one or more of the client devices for executing code for the interaction slate. For example, application code can be executed in a container at the client device of an attendee that creates or otherwise instantiates a particular interaction slate. In such examples, the video conferencing system 140 can manage execution of the application code to provide a collaborative and consistent representation of the content. In yet another example, the application code can be distributed to or executed by two more client devices of attendees of the video conference. In such an example, the video conferencing system can communicate with the video conferencing applications 122 at each client device so the state of the distributed application changes in response to inputs from any of the client devices.

FIG. 6 is a flow diagram depicting an example method of generating a multi-attendee video conference including a multi-user interaction slate in accordance with example embodiments of the present disclosure. Although FIG. 6 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

At 602, method 600 includes receiving one or more requests to stream video for attendees of a video conference. More particularly, one or more computing devices can receive one or more requests to stream video associated with multiple attendees for display at a client device. The one or more requests can be issued by a client device in association with viewing video streams of multiple attendees.

At 604, method 600 includes providing data for video streams of the requested attendees to the client device(s) requesting to stream the video. In some examples, video conferencing system 140 can provide data for display in video slates of a video conferencing application at the client device(s). In some examples, the data may be formatted for different displays, resolutions, etc. For example, a primary slate may utilize a larger area of a display device relative to other video slates.

At 606, method 600 includes receiving a request from a first attendee of the video conference to create a multi-user interaction slate for the video conference. The request may indicate a particular application to be launched, user settings, display settings, and/or other data associated with the requested interaction slate. The request may include data indicating an application such as a web browser, video player, game, etc. that is to be executed in the multi-user interaction slate to enable multiple attendees to interact with the application. The request can further include data provided by the attendee to control interaction through display settings or permissions for interaction with a multi-user interaction slate by other attendees of the video conference.

At 608, method 600 includes generating the multi-user interaction slate in accordance with the request from the attendee. The video conferencing system may instantiate the multi-user interaction slate and execute application code in association with the slate. In some examples, a slate manager may execute the application code in one or more containers at a server computing system for the video conferencing system and/or at one or more client devices of the attendees of the video conference. For example, the code may be executed centrally in response to user inputs and content associated with execution of the instructions can be provided to the individual client devices of the attendees. In another example, a container may be deployed at one or more of the client devices for executing code for the interaction slate. For example, application code can be executed in a container at the client device of an attendee that creates or otherwise instantiates a particular interaction slate. In such examples, the video conferencing system can manage execution of the application code to provide a collaborative and consistent representation of the content. In yet another example, the application code can be distributed to or executed by two more client devices of attendees of the video conference. In such an example, the video conferencing system can communicate with the applications at each client device so the state of the distributed application changes in response to inputs from any of the client devices.

At 610, method 600 includes receiving one or more inputs for the multi-user interaction slate from multiple attendees of the shared video conference. For example, the video conferencing system 140 may receive inputs from a first attendee at a first client device and a second attendee at a second client device. The video conferencing system 140 can initiate actions in response to the inputs from multiple attendees of the video conference.

At 612, method 600 includes determining a current state of the multi-user interaction slate in response to the one or more inputs. By way of example, the slate manager may respond to inputs from a first user and update the state of the multi-user interaction slate. The slate manager can then respond to inputs from the second user and update the state of the multi-user interaction slate.

At 614, method 600 includes providing data for rendering content for the multi-user interaction slate at each client device. The slate manager can transmit content data and/or state data to the client devices to update the multi-user interaction slate at each client device based on the inputs from the first user. The slate manager can transmit content data and/or state data to the client devices to update the multi-user interaction slate at each client device based on the inputs from the second user. In some examples, inputs from multiple users may conflict, such as where a second user provides an input prior to the multi-user interaction slate being updated in response to a first user input. Various techniques may be used to handle such conflicts. For example, the system may execute the first user input and not execute the second user input. This can permit the second user to determine whether their input should be resubmitted based on the updates from the first user. In another example, the system may execute the first user inputs, update the multi-user interaction slate state, then execute the second user inputs and update the multi-user interaction slate.

Figure 7:
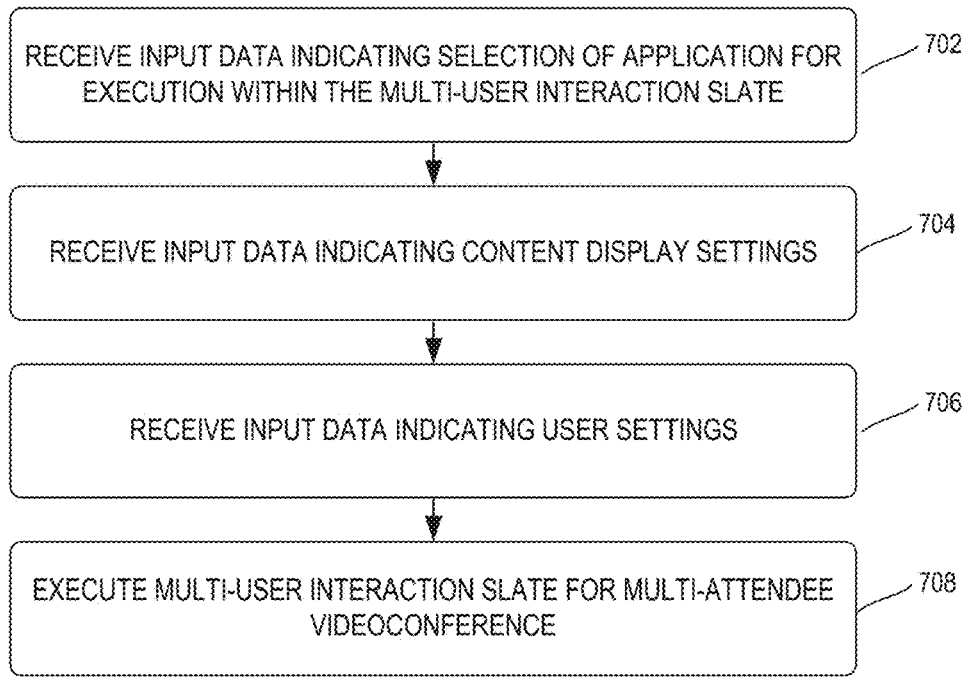
FIG. 7 depicts a flow diagram for creating a multi-user interaction slate according to example embodiments of the present disclosure.

FIG. 7 is a flow diagram depicting an example method 700 of creating a multi-user interaction slate for a video conference in accordance with example embodiments of the present disclosure. Although FIG. 7 depicts steps performed in a particular order for purposes of illustration and discussion, the methods of the present disclosure are not limited to the particularly illustrated order or arrangement. The various steps of method 700 can be omitted, rearranged, combined, and/or adapted in various ways without deviating from the scope of the present disclosure.

At 702, method 700 includes receiving input data from an attendee client device indicating a selection of an application for execution within the multi-user interaction slate. User input may be provided via a GUI provided by the video conferencing application 122 at a client device. The video conferencing system 140 may receive a user input indicating selection of a predefined application available for instantiation within the interaction slate. In another example, video conferencing system 140 may receive a user input indicating a location of user-defined code that is to be executed within the interaction slate.

At 704, method 700 includes receiving input data from the attendee client device indicating one or more content display settings. The content display setting(s) enable the creator of the interaction slate to manage the display of content within the interaction slate at each client device. The display settings may enable the first user to lock the display of the interaction slate at particular client devices or to enable the client devices to individually control the display of content. A locked view provides a consistent view of the interaction slate at each client device. An individual view permits each user and/or client device to have an independent view of the multi-user interaction slate. In some examples, a respective display of content within the multi-user interaction slate at each client device is responsively adaptive to view capabilities associated with such client device. The content can adapt to the view capabilities of a smartphone, tablet device, or desktop computer, for example.

At 706, method 700 includes receiving input data from the attendee client device indicating one or more user settings. The content display setting(s) enable the creator of the interaction slate to manage the permissions granted to particular attendees of the video conference with respect to the interaction slate. For example, the user settings can enable the first attendee to select or otherwise define which attendees are able to view, edit, otherwise interact with the interaction slate to affect the display of content. By way of example, a first user can be granted different (e.g., more or fewer) permissions than a second user. The first user may be granted view and full edit permissions while the second user may only be granted view permissions and limited editing permissions. The permissions granted to a particular user may be changed.

At 708, method 700 includes executing the multi-user interaction slate for the video conference. The video conferencing system 140 may execute computer-executable code for one or more applications associated with the interaction slate, such as html code for a web browser. Video conferencing applications 122 at the client devices may receive inputs from attendees of the video conference. The inputs may be executed by the interaction slate to maintain a current state of the interaction slate across all client devices. In some examples, slate manager 408 may execute commands and provide updated content data and/or state data to the video conference applications at each client device.

Figure 8:
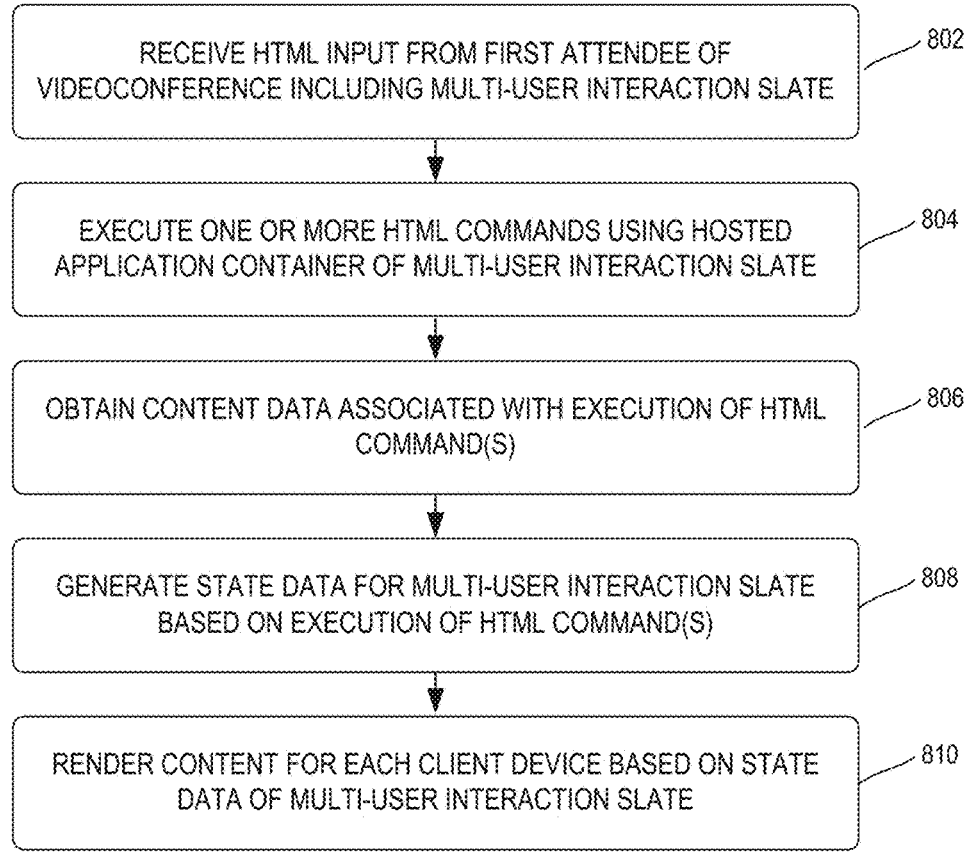
FIG. 8 depicts a flow diagram for executing a multi-user interaction slate according to example embodiments of the present disclosure.

FIG. 8 is a flow diagram depicting an example method 800 of executing an application in association with a multi-user interaction slate of a video conferencing system in accordance with example embodiments of the present disclosure. FIG. 8 depicts a particular example of executing a web browser application in an interaction slate. Although FIG. 8 depicts steps performed in a particular order for purposes of illustration and discussion, the methods of the present disclosure are not limited to the particularly illustrated order or arrangement. The various steps of method 800 can be omitted, rearranged, combined, and/or adapted in various ways without deviating from the scope of the present disclosure.

At 802, method 800 includes receiving one or more inputs from a first attendee of a video conference including a multi-user interaction slate. The input(s) may include html commands or methods such as html GET, POST, PUT, DELETE, etc. The input at 802 may be associated with any type of html command, method or the like.

At 804, method 800 includes executing the html command(s) using a hosted web browser container of the interaction slate. The web browser container may be executed by the video conferencing system at a central computing device and/or locally by one or more client devices.

At 806, method 800 includes obtaining content data associated with execution of the html commands. For example, web content may be retrieved in response to the first attendee clicking a link to a web resource. The content data may be obtained the video conferencing system 140 where the application code is executed by server computing system 130 The content data may be obtained directly by the video conferencing application executing at one or more client devices in some examples.

At 808, method 800 includes generating state data for the multi-user execution slate based on execution of the html command(s). In some examples, the state data may include the content data corresponding to execution of the html commands for the current state. In other examples, the state day may include instructions for one or more client devices to execute for the current state of the interaction slate. For instance, the video conferencing system 140 may generate state data that includes html commands to be executed locally by each video conferencing application 122 to maintain a current state of the interaction slate.

At 810, method 800 includes rendering content for each client device based on the state data of the multi-user interaction slate. In some examples, the video conferencing application 122 at each client device may received updated content data which is rendered in the interaction slate at the respective client device. In other examples, the video conferencing application 122 at each client device may receive instructions or commands which it executes in order to retrieve and render the content locally.

Although FIG. 8 depicts a particular example of executing a web browser application in an interaction slate, it will be appreciated that a similar method may be performed for executing other applications.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising, by one or more processors:
   receiving a request from a first user of a first client device for execution of a multi-user interaction slate within a graphical user interface of a video conferencing system including a plurality of slates, the plurality of slates including a first slate associated with a video stream of the first user, a second slate associated with a video stream of a second user of a second client device, and the multi-user interaction slate associated with an application executed in a container within the video conferencing system, the application including containerized computer-executable code that is responsive to inputs provided by the first user at the first client device and inputs provided by the second user at the second client device;
   determining a current state of the multi-user interaction slate in response to one or more inputs provided by the first user at the first client device in association with the multi-user interaction slate and one or more inputs provided by the second user at the second client device in association with the multi-user interaction slate; and
   providing data for rendering the graphical user interface of the video conferencing system, the data including video data associated with the first user for the video stream of the first slate, video data associated with the second user for the video stream of the second slate, and state changes of the multi-user interaction slate in the container based on the one or more inputs at the application provided by the first user at the first client device and the second user at the second client device.

2. The computer-implemented method of claim 1, further comprising:
   receiving one or more settings from the first user corresponding to a respective display of content within the multi-user interaction slate at each client device;
   wherein a first setting indicates that a respective display of content within the multi-user interaction slate at each client device is locked to a consistent view for each user of the multi-user interaction slate; and
   wherein a second setting indicates that the respective display of content within the multi-user interaction slate is individually controllable such that each user has an independent view of content within the multi-user interaction slate.

3. The computer-implemented method of claim 1, further comprising, by the one or more processors:
   receiving data associated with one or more inputs from the first user indicating permissions for the second user with respect to the multi-user interaction slate.

4. The computer-implemented method of claim 3, wherein:
   the permissions of the second user are fewer than permissions of the first user.

5. The computer-implemented method of claim 4, further comprising:
   receiving data associated with one or more inputs from the first user indicating one or more changes to the permissions for the second user with respect to the multi-user interaction slate.

6. The computer-implemented method of claim 1, wherein:
   the computer-executable code of the multi-user interaction slate is executed by one or more computing devices remote from the first client device and the second client device.

7. The computer-implemented method of claim 1, wherein:
   the computer-executable code of the multi-user interaction slate is executed by at least one of the first client device and the second client device.

8. The computer-implemented method of claim 1, wherein:
the multi-user interaction slate includes a web browser application configured for execution of hyper-text markup language computer-executable code.

9. The computer-implemented method of claim 1, wherein:
the multi-user interaction slate includes a gaming application.

10. A computing system, comprising:
one or more processors; and
one or more non-transitory, computer-readable media that store instructions that when executed by the one or more processors cause the computing system to perform operations, the operations comprising:
receiving a request from a first user of a first client device for execution of a multi-user interaction slate within a graphical user interface of a video conferencing system including a plurality of slates, the plurality of slates including a first slate associated with a video stream of the first user, a second slate associated with a video stream of a second user of a second client device, and the multi-user interaction slate associated with an application executed in a container within the video conferencing system, the application including containerized computer-executable code that is responsive to inputs provided by the first user at the first client device and inputs provided by the second user at the second client device;
determining a current state of the multi-user interaction slate in response to one or more inputs provided by the first user at the first client device in association with the multi-user interaction slate and one or more inputs provided by the second user at the second client device in association with the multi-user interaction slate; and
providing data for rendering the graphical user interface of the video conferencing system, the data including video data associated with the first user for the video stream of the first slate, video data associated with the second user for the video stream of the second slate, and state changes of the multi-user interaction slate in the container based on the one or more inputs at the application provided by the first user at the first client device and the second user at the second client device.

11. The computing system of claim 10 wherein the operations further comprise:
receiving one or more settings from the first user corresponding to a respective display of content within the multi-user interaction slate at each client device;
wherein a first setting indicates that a respective display of content within the multi-user interaction slate at each client device is locked to a consistent view for each user of the multi-user interaction slate; and
wherein a second setting indicates that the respective display of content within the multi-user interaction slate is individually controllable such that each user has an independent view of content within the multi-user interaction slate.

12. The computing system of claim 10 further comprising, by the one or more processors:
receiving data associated with one or more inputs from the first user indicating permissions for the second user with respect to the multi-user interaction slate.

13. The computing system of claim 10, wherein:
the computer-executable code of the multi-user interaction slate is executed by one or more computing devices remote from the first client device and the second client device.

14. One or more non-transitory computer-readable media that store instructions that, when executed by one or more processors of a computing system, cause the computing system to perform operations comprising:
receiving a request from a first user of a first client device for execution of a multi-user interaction slate within a graphical user interface of a video conferencing system including a plurality of slates, the plurality of slates including a first slate associated with a video stream of the first user, a second slate associated with a video stream of a second user of a second client device, and the multi-user interaction slate associated with an application executed in a container within the video conferencing system, the application including containerized computer-executable code that is responsive to inputs provided by the first user at the first client device and inputs provided by the second user at the second client device;
determining a current state of the multi-user interaction slate in response to one or more inputs provided by the first user at the first client device in association with the multi-user interaction slate and one or more inputs provided by the second user at the second client device in association with the multi-user interaction slate; and
providing data for rendering the graphical user interface of the video conferencing system, the data including video data associated with the first user for the video stream of the first slate, video data associated with the second user for the video stream of the second slate, and state changes of the multi-user interaction slate in the container based on the one or more inputs at the application provided by the first user at the first client device and the second user at the second client device.

15. The one or more non-transitory computer-readable media of claim 14, wherein the operations further comprise:
receiving one or more setting inputs from the first user corresponding to a respective display of content within the multi-user interaction slate at each client device;
wherein a first setting indicates that a respective display of content within the multi-user interaction slate at each client device is locked to a consistent view for each user of the multi-user interaction slate; and
wherein a second setting indicates that the respective display of content within the multi-user interaction slate is individually controllable such that each user has an independent view of content within the multi-user interaction slate.

16. The one or more non-transitory computer-readable media of claim 14, wherein:
a respective display of content within the multi-user interaction slate at each client device is responsively adaptive to view capabilities associated with such client device.

17. The one or more non-transitory computer-readable media of claim 14, wherein:
the computer-executable code of the multi-user interaction slate is executed by at least one of the first client device and the second client device.

18. The computer-implemented method of claim 1, wherein the container is in a cloud network.

19. The computer-implemented method of claim 1, wherein the container includes multiple containers at client devices executing a distributed application.

20. The computer-implemented method of claim 1, wherein the application executed in the container is a third party application.

* * * * *